Aug. 19, 1941.  G. W. SABOLD  2,253,199
BRAKE SAFETY HANGER
Filed Jan. 20, 1940  2 Sheets-Sheet 1

INVENTOR
Gordon W. Sabold
BY John P. Tabor
ATTORNEY

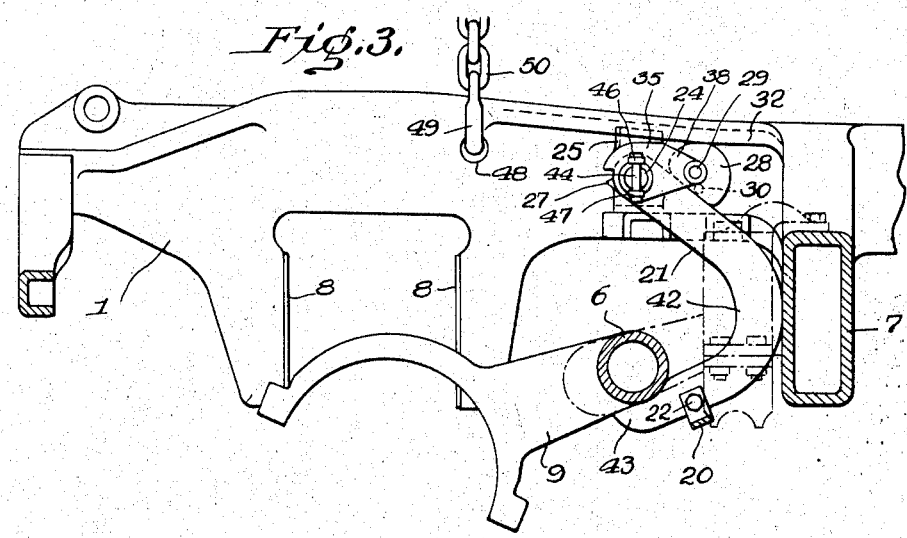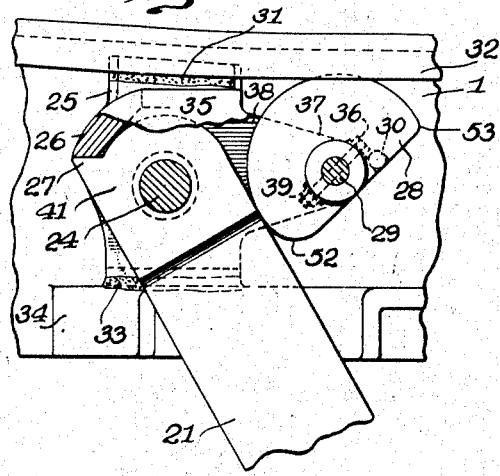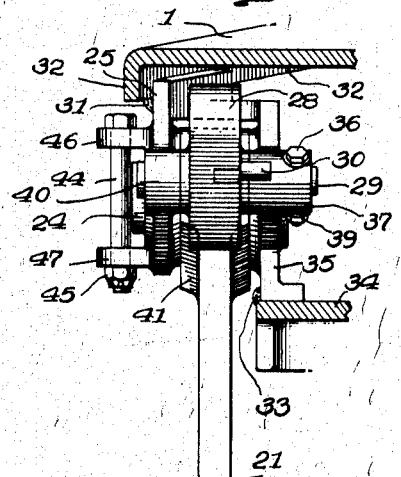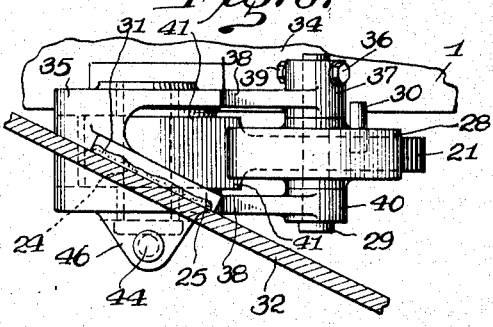

Patented Aug. 19, 1941

2,253,199

UNITED STATES PATENT OFFICE 2,253,199

BRAKE SAFETY HANGER

Gordon W. Sabold, Fort Washington, Pa., assignor to Budd Wheel Company, Philadelphia, Pa., a corporation of Pennsylvania Application January 20, 1940, Serial No. 314,746

9 Claims. (Cl. 188—210)

The present invention relates to brakes, more particularly to brakes of the so-called disk type, wherein a brake ring secured to a rotating part has brake shoes cooperating therewith, which may be applied against the sides of the ring, to produce the braking effort.

More particularly, it relates to means for assisting in assembling and dismounting brake mechanisms, by providing an adequate support for certain parts of the said mechanism, while the wheel and axle members are out of the assembly.

Specifically the invention relates to safety hooks or hangers, which cooperate with certain parts of the brake mechanism, and which may be readily engaged and/or disengaged when work is being done on the said mechanism.

A further object is to provide emergency supports for parts of the brake mechanism.

In order to explain the invention clearly, the present specification discloses a preferred embodiment thereof, a specific example of which is illustrated more or less diagrammatically in the accompanying drawings, wherein:

Fig. 3 is a section taken on the same line as Figure 2 showing certain parts omitted and other parts in different positions.

Fig. 4 is a fragmentary detail, partly broken away and partly in section, showing the upper end of a hanger and a cam cooperating therewith;

Fig. 5 is a fragmentary detail, showing a rear elevation of a hanger, with adjacent parts of the frame shown in section and partly broken away; and Fig. 6 is a detail plan view corresponding to Fig. 5, with a portion of the frame shown in section.

In all the figures, corresponding parts are indicated by similar reference characters.

Figure 1:
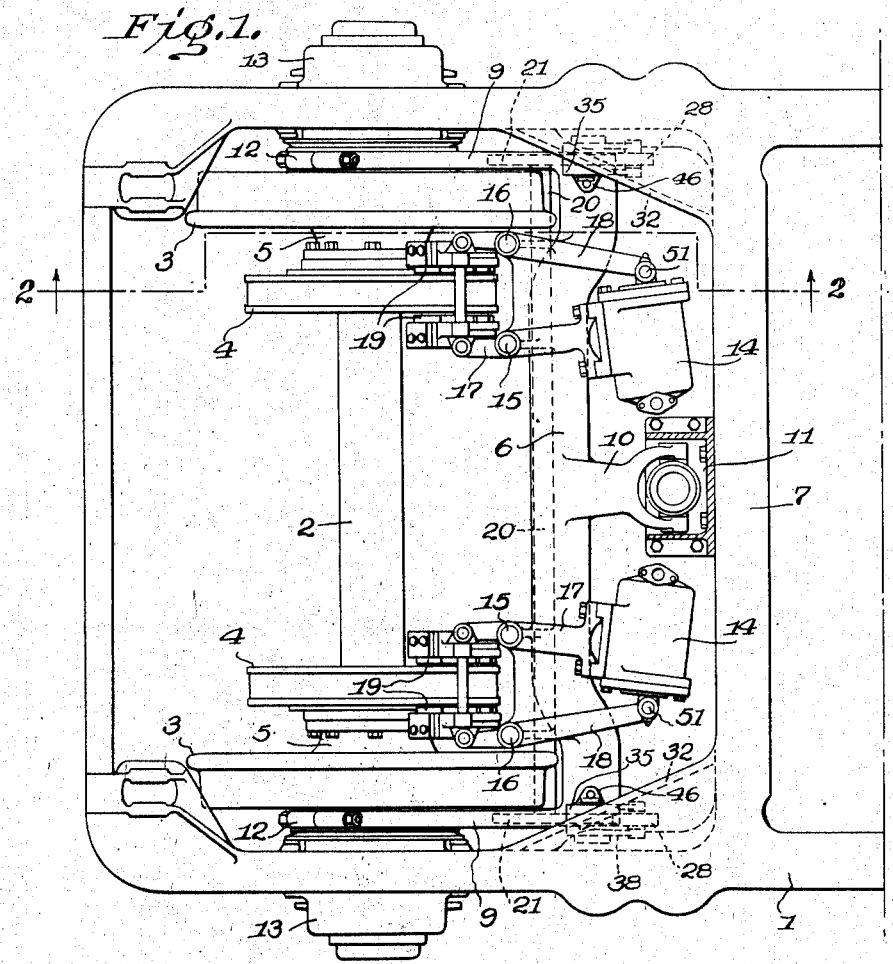
Fig. 1 is a partly sectional plan view of a fragmentary portion of a wheel truck to which the invention has been applied.

Referring to the drawings, 1 designates the frame of a wheel truck, carrying the axle 2, mounted in journal bearings 13, and carrying the wheels 3. Each wheel carries a brake ring 4, which as shown is secured by means of bolts or the like to the corresponding wheel hub 5.

6 designates the preferably tubular cross piece of a C-frame or yoke, which supports the brake applying mechanism, consisting of brake cylinders 14, carried by brake levers 17, pivotally mounted on pins 15, carried by the member 6; and further brake levers 18 pivotally carried by other pins 16, also carried by the member 6. The levers 18 are attached as shown at 51 to the ends of the piston rods of the brake cylinders, so that when air pressure is applied to the brake cylinders the rear ends of the levers 17 and 18 will be forced apart, thus bringing the brake shoes 19, carried by the forward arms of said levers, into braking contact with the side faces of the respective brake rings 4.

The cross piece 6 of the brake supporting yoke or C-frame carries a rearwardly extending torque arm 10, which enters into a box or casing 11 secured to a cross piece 7 of the truck frame 1, said box preferably containing yieldable means for preventing excessive up-and-down movement of the rear end of the arm 10. The journal boxes 13 are mounted in the pedestals 8, and upon the inner ends of said journal boxes are pivotally mounted the ends of supporting means for the cross piece 6, here comprising arms 9, secured to the ends of the said cross piece 6, and having substantially semi-circular end portions which cooperate with straps 12 to complete the circles, and to mount said arms on the inner ends of the journal boxes, which preferably will be suitably grooved to receive them. The cross piece 6 is therefore capable of pivotal movement about the axis of the corresponding axle, except as restrained by the rearwardly extending arm 10, as already stated. The mechanism hereinabove described forms the basis of a copending application, Serial No. 270,750, filed April 29, 1939, now Patent No. 2,236,898, issued April 1, 1941, and is embodied herein to illustrate one way in which the present invention may be constructed and operated.

Figure 2:
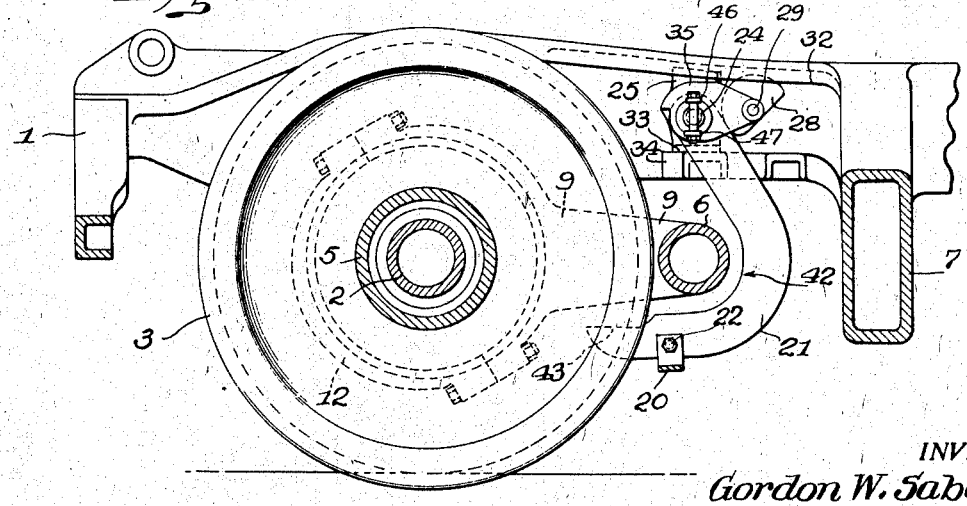
Fig. 2 is a sectional elevation corresponding thereto, the section being made on the planes indicated by the broken line 2—2 of Fig. 1.

Referring to Figs. 2 and 3, it will be seen that a bent hanger 21 is provided at one end of the truck frame, and reference to Fig. 1 shows that such hanger is provided in duplicate at opposite sides of said frame. Each hanger has an intermediate curved portion, as shown at 42, and has a nose 43 which has an offset upper surface, best shown in Fig. 2, which may support the arms 9 on cross piece 6, while assembling or dismounting the brake mechanism.

The two hangers corresponding to each axle are preferably connected by a cross piece such as 20, secured to them by bolts 22 and nuts 23, or in any other suitable way. The hangers 21 preferably have thickened upper ends, as shown at 41 in Figs. 4 and 5, and are supported by suitable pins or other pivots 24, carried by a bracket 35 which is secured to the frame 1, in any suitable way, for example by welding a plate 25 integral therewith to a depending flange 32 of the frame 1 at 31, and further by welding the bracket 35 to another portion 34 of the frame 1, as indicated at 33 in Fig. 5.

In order to prevent the pin 24 from moving out of place and becoming lost, lugs 46 and 47 may be provided on the bracket 35, and a bolt 44 inserted through alined bores in said lugs and secured by a nut 45, thus preventing the adjacent or headed end of the pin 24 from coming out, the other end of said pin being effectively prevented from moving out of place by its head of larger diameter than the pin, see Fig. 6.

The upper end of each hanger 21 adjacent its pivot preferably has a nose or projection 27, which will cooperate with an abutment 26 of the bracket 35 to prevent further forward motion of the lower end of the hanger, as best shown in Fig. 4. The bracket 35 has the rearwardly extending arms 38, carrying the bored lugs 37 and 40, through which passes a pin 29 serving to pivotally support a cam 28. In order to prevent the pin 29 from becoming dislodged, a bolt 36 may be inserted through alined holes in the lug 37 and in the pin 29, said bolt being secured by a nut 39 or other suitable means. The cam 28 may have a pin 30 or other stop device therein, to limit the pivotal motion of said cam.

In order to provide means for lifting and supporting the truck frame, a hole 48 may be provided adjacent each end of each axle, to cooperate with a hook 49, carried by a chain 50 leading to a suitable lifting crane or the like.

The operation of the invention is as follows:

Let it be assumed that the brake and axle mechanisms are to be assembled in a truck frame. The C-frame or yoke, which comprises the arms 9, the cross piece 6 and the rearwardly extending torque arm 10 must first be placed in the truck and since these C-frames are relatively heavy, it is very desirable to have some ready means for supporting their weight and holding them in readiness, while the axles and wheels, etc., are being assembled on the frame. This is accomplished by the hangers 21, which may be placed in the position shown in Fig. 3, so that the offset end or nose 43 of each hanger will engage under a corresponding end of the cross piece 6 and prevent it from slipping out of position.

During this operation the hanger 21 may be kept in its rearward position after first turning the cam 28 into such position that its flat side will rest against the hanger, as clearly shown in Fig. 3. Thereupon the wheel-and-axle assembly is put in position by sliding the journal boxes 13 into position between the pedestals 8, which may be accomplished of course either by lifting the said assembly into place, or by dropping the truck frame over the said journal boxes, depending upon the shop equipment employed. During this operation care must of course be taken to enter the brake rings 4 properly between the brake shoes 19, and to avoid injury to any of the said mechanism. This is materially facilitated by the use of the hangers 21, which are at this time maintained in proper position by abutting against the flat sides of the cams 28.

After the journal boxes have been inserted in place with the semi-circular ends of the arms 9 engaged therearound, the said arms 9 will have lifted the cross piece 6 away from the safety hangers 21, which will thereupon drop by their own weight to the position indicated in Fig. 2, wherein they clear the cross piece 6 but nevertheless will retain it, in case anything happens to prevent the arm 10 from holding it up, so that in the event of breakage of the arm 10 or of the structure supporting said arm, the safety hangers 21 will continue to hold the C-frame or brake supporting yoke from dropping to the roadbed, and also will serve as emergency supports at such time, so that the brakes may continue to function until permanent repairs can be made. In order to prevent the hangers from swinging about, or becoming shifted out of their proper safety positions, the cam 28 may be turned to lock the same firmly in place, this position being shown in Figs. 2 and 4.

It will be noted that in this position the stop 27 at the top of the hanger engages the abutment 26, so that the hanger cannot move forward too far, while at the same time the cam 28 is firmly wedged against the rear of the hanger, so that it thus is locked against motion in either direction. The cam 28 is made with a radius increasing slightly from the end 52 to the end 53 thereof, so that a powerful wedging action may be had by striking the cam 28 with a hammer near its end 53, and it will also be noted that because of the relatively slight rate of increase of radius of the cam, it is self-locking and will not become disengaged accidentally, when once tightened.

It will thus be understood that the hangers serve two separate functions, first to hold the C-frame or yoke and the parts carried thereby in proper position while assembling or dismantling a wheel truck, and second to provide a safety or emergency means for holding the C-frame or yoke out of contact with the roadbed and maintaining the brake mechanism in operative condition in case of failure of the torque arm 10, so that the car may continue in service until permanent repairs can be made.

While a preferred form of the invention has been disclosed herein, as applied to a particular type of brake mechanism, it is clear that the invention is of broader application than such specific instance, and also that various modifications may be made in the structures employed, without departing from the invention, which is defined in the following claims.

What is claimed is:

1. A wheel truck having a brake mechanism including a brake supporting yoke, a hanger pivoted on the truck, said hanger having a bent end movable into a position below and spaced from said yoke when swung about its pivot in one direction, and means for securing the hanger in said position.

2. A wheel truck having a brake mechanism including a brake supporting yoke, a hanger pivoted on the truck, said hanger being swingable about its pivot to one limit position and having a bent portion adapted to engage said yoke in said position and prevent it from falling while the brake mechanism is incompletely assembled.

3. A wheel truck having a brake mechanism including a yoke, a hanger pivoted on the truck, said hanger having a bent end movable into two limiting positions, in one of which it engages the yoke and prevents it from falling while the brake mechanism is incompletely assembled, and in the other of which it is located below said yoke but normally out of contact therewith.

4. A wheel truck having a brake mechanism including a yoke, a hanger pivoted on the truck, said hanger having a bent end movable into two limiting positions, in one of which it engages the yoke and prevents it from falling while the brake mechanism is incompletely assembled, and in the other of which it is located below said yoke but normally out of contact therewith, and means for locking the hanger at will in said last-named position.

5. A wheel truck having a brake mechanism including a yoke, a hanger pivoted on the truck, said hanger having a portion movable into position below said yoke at will, and a cam for locking the hanger when in such position.

6. A wheel truck having a brake mechanism including a yoke, a hanger pivoted on the truck, stops for limiting the pivotal movement of the hanger in each direction, said hanger having a bent portion adapted to extend beneath the yoke, said stops defining two limit positions of the said portion, in one of which it engages the yoke to support it while the brake mechanism is incompletely assembled and in the other of which it extends below the yoke but out of contact therewith, one of said stops being adjustable to lock the hanger in the last-named position.

7. A wheel truck having a brake mechanism including a yoke, a hanger pivoted on the truck, stops for limiting the pivotal movement of the hanger in each direction, said hanger having a bent portion adapted to extend beneath the yoke, said stops defining two limit positions of the said portion, in one of which it engages the yoke to support it while the brake mechanism is incompletely assembled and in the other of which it extends below the yoke but out of contact therewith, and a cam for locking the hanger in said last-named position.

8. A wheel truck having a brake mechanism including a transversely extending yoke, two hangers pivoted on the truck adjacent the opposite sides thereof, a transverse member connecting said hangers, said hangers having portions movable under said yoke adjacent its opposite ends.

9. A wheel truck having a brake mechanism including a transversely extending yoke, two hangers pivoted on the truck adjacent the opposite sides thereof, a transverse member connecting said hangers, said hangers having portions movable under said yoke adjacent its opposite ends, and means for securing said hangers against shifting when thus moved.

GORDON W. SABOLD.